United States Patent [19]
Brunschwig et al.

[11] 3,868,767
[45] Mar. 4, 1975

[54] METHOD AND APPARATUS FOR ASSEMBLING COMPONENTS FOR A DYNAMOELECTRIC MACHINE

[75] Inventors: John M. Brunschwig; William M. Stone, both of De Kalb, Ill.

[73] Assignee: General Electric Company, Fort Wayne, Ind.

[22] Filed: Apr. 1, 1974

[21] Appl. No.: 456,479

[52] U.S. Cl.............. 29/598, 29/205 R, 308/22, 310/42, 310/90
[51] Int. Cl. ........................................ H02k 15/04
[58] Field of Search...... 29/598, 596, 205 R, 205 D; 310/90, 42; 308/22

[56] References Cited
UNITED STATES PATENTS

| | | | |
|---|---|---|---|
| 3,268,986 | 8/1966 | Lacy | 29/596 |
| 3,483,409 | 12/1969 | Phillips | 29/596 X |
| 3,538,598 | 11/1970 | Wightman et al. | 29/596 |
| 3,714,705 | 2/1973 | Lewis | 29/596 |

Primary Examiner—Carl E. Hall
Attorney, Agent, or Firm—Joseph E. Papin

[57] ABSTRACT

A method of assembling a rotatable member with bearing means of a structural component for a dynamoelectric machine. In this method, the structural component is disposed upon means for fixturing it with the bearing means being engaged with means for supporting it which is movable in the fixturing means. The structural component and supporting means are conjointly displaced generally toward predeterminately spaced apart locating surfaces on the fixturing means to engage at least a portion of the structural component with one of the locating surfaces, and the supporting means is maintained in its displaced position. The rotatable member is moved relative to the bearing means into assembled relation therewith and into engagement with the other of the locating surfaces for terminating the rotatable member movement.

Other methods of assembling and apparatus for assembling a rotatable number with bearing means of a structural component for a dynamoelectric machine are also disclosed.

37 Claims, 2 Drawing Figures

METHOD AND APPARATUS FOR ASSEMBLING COMPONENTS FOR A DYNAMOELECTRIC MACHINE

BACKGROUND OF THE INVENTION

This invention relates generally to dynamoelectric machines and in particular to methods and apparatus for assembling components therefor.

In the past, various methods and apparatus were devised for effecting the assembly of a rotatable member, such as a shaft having a rotor mounted thereto, into press-fitting relation with bearing means, such as a ball or roller type bearing for instance, which was mounted to a structural component, such as an end frame, for a dynamoelectric machine. Since the bearing was mounted to the end frame, quite obviously there were tolerance or dimensional variances with respect to the mounted position of the bearing in the various end frames. As a result of such dimensional variances, one of the disadvantageous or undesirable features of such past methods and apparatus was that the shaft extension exteriorly of the end frame was not generally uniform. An ancillary disadvantageous feature of such past methods and apparatus was that the non-uniform shaft extension sometimes adversely affected mounting of a dynamoelectric machine with a device which it was adapted to drive. Further, while a roller or ball type bearing or the like has rather great capacity or strength for resisting generally radially directed forces, its capacity for resisting generally axially directed forces is appreciably less. Therefore, another disadvantageous or undesirable feature of such past methods and apparatus was that the generally axially directed force necessary for press-fitting the shaft through the inner race of the bearing into assembled relation therewith was transmitted to the other anti-friction components of the bearing sometimes destroying or at least impairing their anti-friction characteristics or capacity. An ancillary disadvantageous feature of such past methods and apparatus was that many dynamoelectric machines after being assembled in production were to late found to be defective due to the adverse affect of the press-fitting of the shaft into the bearing of the end frame, as discussed above.

SUMMARY OF THE INVENTION

Among the several objects of the present invention may be noted the provision of methods and apparatus for assembling a rotatable member with bearing means of a structural component for a dynamoelectric machine which overcome the disadvantageous or undesirable features discussed hereinbefore, as well as others, with respect to the past methods and apparatus; the provision of such methods and apparatus in which tolerance or dimensional variance between the actual mounted position of the bearing means and the preferred or predetermined mounted position thereof in the various structural components is automatically ascertained and compensated for during assembly of the rotatable machine with the bearing means; the provision of such methods and apparatus in which an inner race of the bearing means is supported in such a manner so as to generally isolate the other anti-friction components thereof from a force for press-fitting the rotatable member into assembled relation with the bearing means; the provision of such methods and apparatus in which the force for press-fitting the rotatable member into assembled relation with the bearing means is absorbed by means for fixturing the structural component; and the provision of such methods and apparatus which reflect simplistic design, economical manufacture and ease of assembly. Other objects and advantageous features of the present invention will be in part apparent and in part pointed out hereinafter.

In general, a method in one form of the invention for assembling a rotatable member with a bearing means mounted to a structural component for a dynamoelectric machine comprises disposing only an inner race of the bearing means generally coaxially of and in engagement with means for supporting it and then press-fitting the rotatable member through the inner race of the bearing means while transmitting the force of the press-fitting only to the supporting means and isolating the other anti-friction components of the bearing means from the press-fitting force.

Also in general, another method in one form of the invention for predeterminately positioning a rotatable member with respect to bearing means mounted to a structural component for a dynamoelectric machine comprises determining the position of the bearing means relative to at least a predetermined portion of the structural component and then assembling the rotatable member with the bearing means by locating at least another predetermined portion on the rotatable member relative to the structural component predetermined portion.

Further and in general, a method in one form of the invention for assembling a rotatable member with bearing means of a structural component for a dynamoelectric machine includes disposing the structural component upon means for fixturing it with the bearing means being engaged with means for supporting it which is movable in the fixturing means. The structural component and supporting means are then conjointly displaced generally toward predeterminately spaced apart locating surfaces on the fixturing means to engage at least a portion of the structural component with one of the locating surfaces, and the supporting means is maintained in its displaced position relative to the other of the locating surfaces. The rotatable member is then moved relative to the bearing means into assembled relation therewith and into engagement with the other locating surface for terminating the rotatable member movement.

Still further and in general, a method in one form of the invention is provided for maintaining within preselected limits a dimension between a selected portion of a rotatable member adapted to be assembled with bearing means mounted in a structural component for a dynamoelectric machine and another selected portion of the structural component. In this method, a dimensional variance between the mounted position of bearing means in the structural component and the selected portion thereof is ascertained and compensated for with respect to at least one predetermined plane of reference. The dimensional variance is maintained constant with respect to another predetermined plane of reference, and the rotatable member is then disposed in assembled relation with the bearing means with the selected portion of the rotatable member generally in the other reference plane.

In general, apparatus in one form of the invention for assembling a rotatable member with bearing means of a structural component for a dynamoelectric machine has means for supporting only an inner race of the bearing means, and means for pressing the rotatable member within the inner race wherein the force of the pressing is transmitted only to the supporting means so as to generally isolate the other anti-friction components of the bearing means from the force.

Also in general, apparatus in one form of the invention for assembling a rotatable member with bearing means of a structural component for a dynamoelectric machine has means for fixturing the structural component including a pair of means predeterminately spaced apart for locating the rotatable member and structural component. Means is provided for moving the structural component toward a located position engaging at least a portion thereof with one of the locating means, and means for supporting at least a portion of the bearing means is conjointly movable with the structural component toward the located position. Means is also provided for moving the rotatable member relative to the bearing means into assembled relation therewith until the rotatable member engages the other locating means when the structural component and supporting means are in the located position.

Further in general, apparatus in one form of the invention for assembling a rotatable member with bearing means mounted to a structural component for a dynamoelectric machine has means for fixturing the structural component, and means is provided for determining the mounted position of the bearing means in the structural component relative to a predetermined portion thereof when the structural component is disposed in the fixturing means. Means is provided for moving the rotatable member relative to the bearing means into assembled relation therewith, and means for locating another predetermined portion on the rotatable member relative to the structural component predetermined portion terminates the relative movement of the rotatable member.

Still further and in general, apparatus in one form of the invention for assembling a rotatable member with bearing means mounted to a structural component for a dynamoelectric machine has a pair of relatively movable means for respectively fixturing the rotatable member and the structural component, and the fixturing means are relatively movable for moving the rotatable member and bearing means into assembled relation. One of the fixturing means includes means for compensating for dimensional variance between the mounted position of the bearing means in the structural component and a selected portion thereof to maintain within predetermined limits a dimension between the selected portion and another selected portion on the rotatable member when the rotatable member and bearing means are moved into assembled relation.

BRIEF DESCRIPTION OF THE DRAWINGS

Corresponding reference characters indicate corresponding parts throughout the several views of the drawings.

Figure 1:
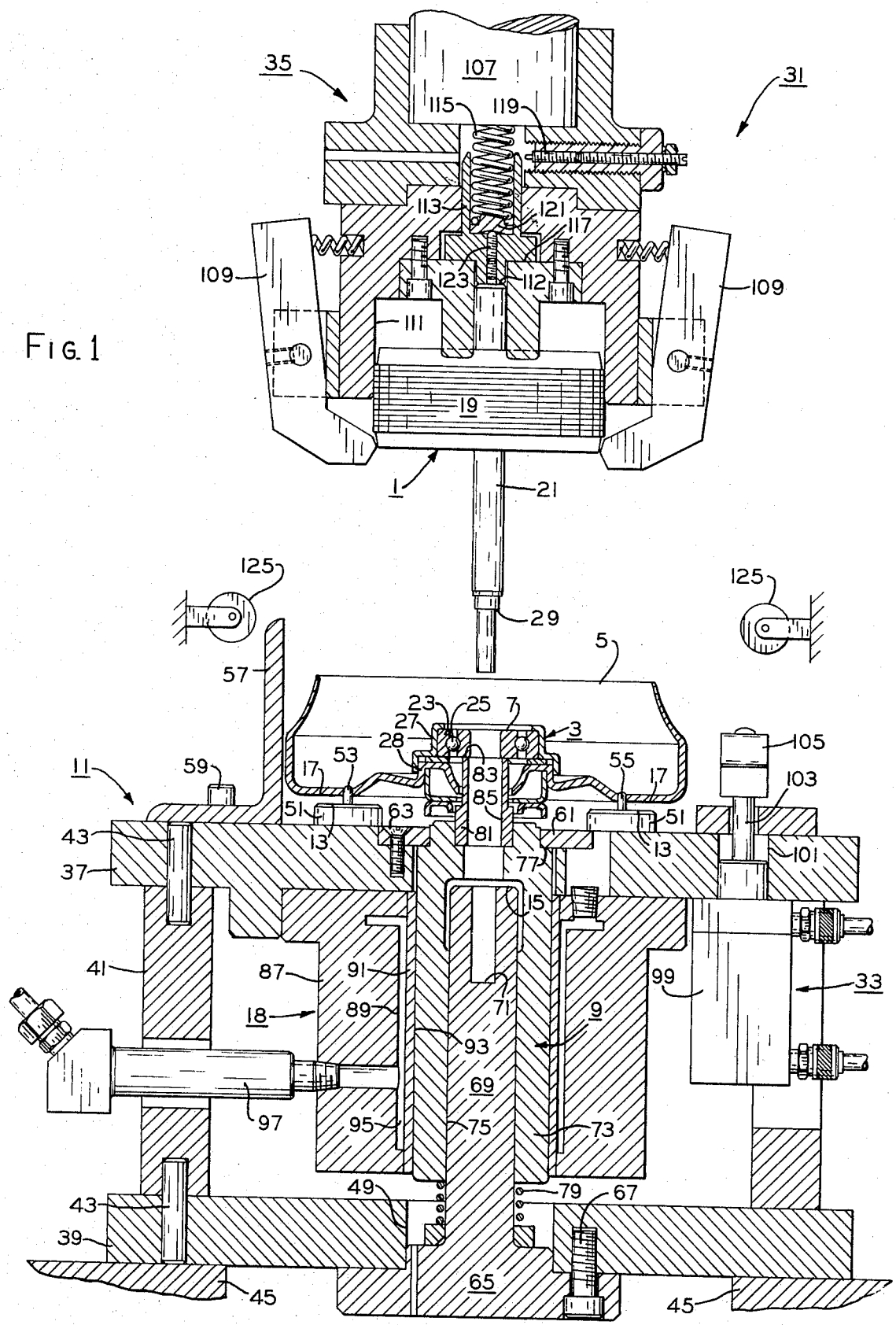
FIG. 1 is a sectional view of fixturing means embodying the present invention for assembling a rotatable member with bearing means of a structural component for a dynamoelectric machine and teaching principles of methods for such assembling also embodying the present invention.

The following examples merely illustrate the invention and are not to be construed as limiting in any manner.

DESCRIPTION OF THE PREFERRED EMBODIMENTS

Referring to the drawings in general, there is illustrated a method in one form of the invention for assembling a rotatable member 1 with bearing means 3 mounted to a structural component, such as an end frame 5, for a dynamoelectric machine (not shown). In this method, only an inner race 7 of bearing means 3 is disposed generally coaxially of and in engagement with means, indicated generally at 9 and discussed in detail hereinafter, for supporting it. Rotatable member 1 is then press-fitted through inner race 7 while the force of the press-fitting engagement therebetween is transmitted only to supporting means 9 thereby to isolate the other anti-friction components of bearing means 3 from the press-fitting force.

There is also illustrated in one form of the invention another method for assembling rotatable member 1 with bearing means 3 of end frame 5 for a dynamoelectric machine (not shown). In this method, end frame 5 is disposed upon means, indicated generally at 11 and discussed in detail hereinafter, for fixturing it, and bearing means 3 is engaged with supporting means 9 which is movable in the fixturing means. End frame 5 and supporting means 9 are conjointly displaced generally toward predeterminately spaced apart locating or referencing surfaces or planes 13, 15 on fixturing means 11 so that at least a portion, such as a plurality of locating or referencing flats or surfaces 17, of the end frame are engaged with one of the locating surfaces 13. Supporting means 9 is then maintained in its displaced position relative to the other of the locating surfaces 15, and rotatable member 1 is moved relative to bearing means 3 into assembled relation therewith and into locating engagement with other locating surface 15 for terminating the rotatable member movement. In order to maintain supporting means 9 in its displaced position, means, such as a chucking or other positioning device indicated generally at 18 and discussed hereinafter, for maintaining the supporting means against displacement is actuated into gripping, chucking or displacement preventing engagement therewith prior to the movement of rotatable member 1 into assembled relation with bearing means 3.

More particularly, rotatable member 1 is constituted by a rotor 19 and a shaft 21 of types well known in the art, and the other anti-friction components of bearing means 3 include at least an outer race 23 and a plurality of ball bearings 25 interposed between inner and outer races 11, 23. Outer race 23 of bearing means 3 is pressed into a generally annular, stepped sleeve 27 which is in turn pressed onto a hub 28 provided on end frame 5. While bearing means 3 is for purposes of disclosure illustrated as a ball type bearing, it is contemplated that other type bearings, such as a roller bearing or the like for instance, may also be utilized within the scope of the invention. As is well known in the art, bearing means 3 has relatively great strength or capacity for resisting generally radially directed forces, but its capacity for resisting generally axially directed forces is appreciably less. Therefore, it may be noted that the supporting engagement of supporting means 9 with inner race 7 of bearing means 3 permits the transfer of the press-fitting force established upon the press-fitting engagement of rotatable member 1 within the bore of the inner race directly therefrom to the supporting means for absorption by fixturing means 11. In this manner, inner race 7 is supported to generally prevent axial displacement thereof relative to outer race 23 and ball bearings 25 in response to the generally axial directed press-fitting force so as to generally isolate the outer race and ball bearings from the press-fitting force. With such isolation so effected, the possibility that the press-fitting force might destroy, or at least impare, the anti-friction characteristics or capacity of bearing means 3 is, in general, obviated.

In order to maintain a substantially constant or uniform shaft extension, i.e., that portion or length of shaft 21 which extends from the exterior side of end frame 5, a predetermined dimension or distance D is provided between locating surfaces 13, 15 on fixturing means 11. Any variance between a preselected or designed mounted position of bearing means 3 in end frame 5, such as the optimum mounted position as established between tolerance limits, and the actual mounted position of the bearing means in the end frame is determined by the initial conjoint moving of the end frame and supporting means 9 in engagement with the bearing means toward the displaced position to engage or locate referencing flats 17 on the end frame with locating surfaces 13 on fixturing means 11. It may be noted that the conjoint movement of supporting means 9 with bearing means 3, in effect, serves to ascertain and compensate for any dimensional variance V between the actual mounted position of the bearing means and referencing flats 17 when they are in locating or referencing engagement with locating surface 13. When the actual mounted position of bearing means 3 so located and compensated for, rotatable member 1 is moved into assembled relation with the bearing means, as previously mentioned, by positioning another predetermined referencing or locating flat or surface, such as a shoulder 29, on shaft 21 relative to referencing flats 17 on end frame 5. The relative referencing of flats 17 and shoulder 29 is accomplished by moving the shoulder into abutting engagement with locating surface 15 of fixturing means 11 thereby terminating the movement of rotatable member 1 into assembled relation with bearing means 3 and predeterminately limiting the extension of the rotatable member through inner race 7 of the bearing means. Thus, it may be noted that the extension of shaft 21 from the exterior side of end frame 5 with respect to flats 17 thereon is generally constant or uniform being substantially the same as dimension D irrespective of tolerance or dimensional variance V of the mounted position of bearing means 3 in the end frame.

Referring now again in general to the drawings, there is shown at 31 apparatus in one form of the invention for assembling rotatable member 1 with bearing means 3 of end frame 5 for a dynamoelectric machine (not shown). Apparatus 31 includes fixturing means 11 for fixturing end frame 5, and locating surface 13, 15 are predeterminately spaced apart on the fixturing means for locating the end frame and rotatable member 1. Means, such as a plurality of movable clamps 33, is provided for engaging and moving end frame 5 toward its displaced or located position engaging at least a portion thereof, such as referencing flats 17, with locating surface 13, and supporting means 9 in supporting engagement with at least a portion, such as inner race 7, of bearing means 3 is conjointly movable with the end frame toward the located position. Means, such as a fixtured ram or press head or upper fixturing means 35, is provided for moving the rotatable member 1, relative to bearing means 3 into assembled relation therewith until the rotatable member engages locating surface 15 when end frame 5 and supporting means 9 are in the located positions.

More particularly with reference to FIG. 1, fixturing means 11 is provided with upper and lower platens 37, 39 with a generally annular cylindric member 41 interposed therebetween, and the plate and cylindric member are interconnected by suitable means well known in the art, such as a plurality of dowel pins 43 or the like. Lower platen 39 is attached to a press bed or the like shown partially at 45, and a pair of generally coaxial openings 47, 49 extend through platens 37, 39 generally centrally thereof. Locating surfaces 13 are provided on a plurality of buttons 51 predeterminately disposed on or doweled into upper platen 37 about opening 47 therein, and a plurality of guide pins or nipples 53 are provided on the buttons extending therefrom for receiving in sliding and guiding relation a plurality of guide apertures 55 provided through end frame 5 at flats 17 thereon, respectively. A preliminary guide or locator, such as a length of angle iron 57 is also fixedly secured by suitable means, such as studs 59 or the like, to upper platen 37 for general locating engagement with end frame 5 as it is being positioned over buttons 51, as described hereinafter, and an annular guide plate 61 is fixedly attached to the upper platen about opening 47 by suitable means such as a plurality of screws 63. A stepped centerpost 65 is disposed in opening 49 of lower platen 39 and retained therein against displacement by suitable means, such as a plurality of studs 67, and the centerpost includes an integral cylindric extension 69 extending generally coaxially through opening 49 toward upper platen 37, the upper or free end of the centerpost constituting locating surface 15 through which a blind bore 71 is generally coaxially provided for receiving shaft 21.

Supporting means 9 is provided with an elongate annular collar or piston 73 having a stepped bore 75 extending generally coaxially therethrough which is slidably and guidably received on centerpost extension 69. The upper end portion of piston 73 is slidably and guidably engaged with guide plate 61 on upper platen 37, and a stop or abutment, such as a peripheral shoulder 77, provided on the piston is urged toward engagement with the guide plate by resilient means, such as a spring 79, engaged between the lower end portion of the piston and centerpost 65. A generally annular, cylindric shaped support, such as an open ended thimble 81 or the like, has one end portion pressed or otherwise retained in seated engagement on piston 73 within the upper end of stepped bore 75, and the thimble extends generally coaxially upwardly from the piston with the other or upper end portion of the thimble defining a generally annular seat or supporting surface 83 for seating or abutting engagement with inner race 7 of bearing means 3 about its bore. A generally vertically extending passage or bore 85 is provided through thimble 81 and seat 83 thereof communicating in coaxial arrangement or relation with stepped bore 75 of piston 73 for receiving and guiding shaft 21 upon the assembly thereof with bearing means 3.

Maintaining means 18 is constituted by a chucking or clutching device such as a hydraulic chuck for instance, and one such hydraulic chuck is merchandised under the tradename of Hydra-Lock, model AC-28359, by A&C Engineering Co., Inc., Warren, Michigan. Of course, it is understood that other chucking or clutching devices, such as for instance a magnetic clutch well known in the art, may be utilized within the scope of the invention. Hydraulic chuck 18 is provided with a housing 87 having a bore 89 disposed or spaced about piston 73 of supporting means 9, and the housing is attached to the underside of upper platen 37 by suitable means well known in the art (not shown). Gripping means, such as a flexible or expansible metallic tube or sleeve 91, which is adapted to grip piston 73, is provided with a bore wall 93 disposed in sliding and guiding engagement with at least the mid-portion of the piston, and the upper end lower ends of the sleeve are sealably and fixedly connected by suitable means well known in the art, such as brazing or welding or the like (not shown), to housing 87. An expansible fluid pressure chamber 95 is thus defined in housing 87 between bore 89 thereof and sleeve 91 for receiving a pressure fluid from a source thereof (not shown) through fitting 97.

Movable clamps 33 are merchandised under the tradename "Rota-Clamp," model 38112, By Stilson Corp. of Roseville, Michigan. Each of clamps 33 is provided with a housing 99 which is doweled or otherwise fitted into a receiving aperture 101 provided therefor in upper platen 37 of fixturing means 11, and suitable solenoid mechanism (not shown) is encased within the housing for rotating and vertically moving an actuating stem 103 which extends from the housing. To complete the description of fixturing means 11, a clamping finger 105 is attached by suitable means (not shown) to the upper or free end of stem 103 for movement into clamping engagement with an associated portion of end frame 5, as discussed hereinafter.

Upper fixturing means 35 is attached to a reciprocally movable press head on ram 107, and a plurality of spring biased retaining members or fingers 109 are pivotally mounted on the upper fixturing means and urged into positioning engagement with rotor 19 to retain it in its loaded position within a bore 111 of the upper fixturing member. When rotatable member 1 is loaded into upper fixturing means 35, shaft 21 is generally disposed coaxially with respect to bearing means 3 of end frame 5 in lower fixturing means 11, and the upper end of the shaft is closely spaced adjacent a lower or abutting end 112 of a plunger 113. Plunger 113 is urged by the compressive force of a spring 115 toward shaft 21 and into abutting or caging engagement with an abutment 117 provided on upper fixturing means 35, and the plunger is movable in the upper fixturing means against the spring for short circuiting engagement with a sensing mechanism, such as a Vlier pin 119, as well known in the art. Vlier pin 119 is merchandised by Vlier Engineering Corp., Burbank, California, and is operable generally for short circuiting a control circuit (not shown) to permit the completion of the pressing or downward stroke of ram 107 when the pressing force thereof attains at least a predetermined value as shaft 21 is pressed into bearing means 3. The predetermined value of the pressing force is determined by the compressive force of plunger spring 115 which may be adjusted by adjusting means, such as an adjusting screw 121 and retainer 123, disposed in upper fixturing means 35 for adjustably driving the plunger spring. Of course, if this predetermined value of the pressing force is not attained, other means (not shown) are provided to alert the operator. Means, such as rollers or abutment 125, are predeterminately disposed for engagement with retaining members 109 during the stroke of ram 107 to move the retaining members toward a position releasing or disengaged from rotor 19 when shaft 21 is pressed into bearing means 3, as discussed hereinafter.

OPERATION

To initiate each successive pressing operation of fixturing means 11, 35, an operator manually inserts rotatable member 1 into its predetermined position within bore 111 of upper fixturing means 35, and as the rotatable member is so inserted, rotor 19 thereof engages and displaces retaining members 109 which thereafter are resiliently urged back toward their original positions into releasable retaining engagement with the rotor thereby to maintain the rotatable member in its predetermined position in the upper fixturing means (as seen in FIG. 1). Either prior or subsequent to the positioning of rotatable member 1 in upper fixturing means 35, the operator places end frame 5 in its initial position on lower fixturing means 11. In doing so, end frame 5 may be engaged with guide 57 and lowered so that locating apertures 55 in the end frame are placed or guided over guide pins 53, and upon the guiding engagement between the end frame aperture and guide pins, the end frame may be further lowered to locate or seat inner race 7 of bearing means 3 on seat 83 of supporting thimble 81. With end frame 5 and rotatable member 1 so predeterminately disposed on lower and upper fixturing means 11, 35, it may be noted that shaft 21 of the rotatable member is generally in axial alignment with the bore of bearing means defined by inner race 7 thereof, passage 85 of thimble 81, and blind bore 71 of centerpost 69.

Figure 2:
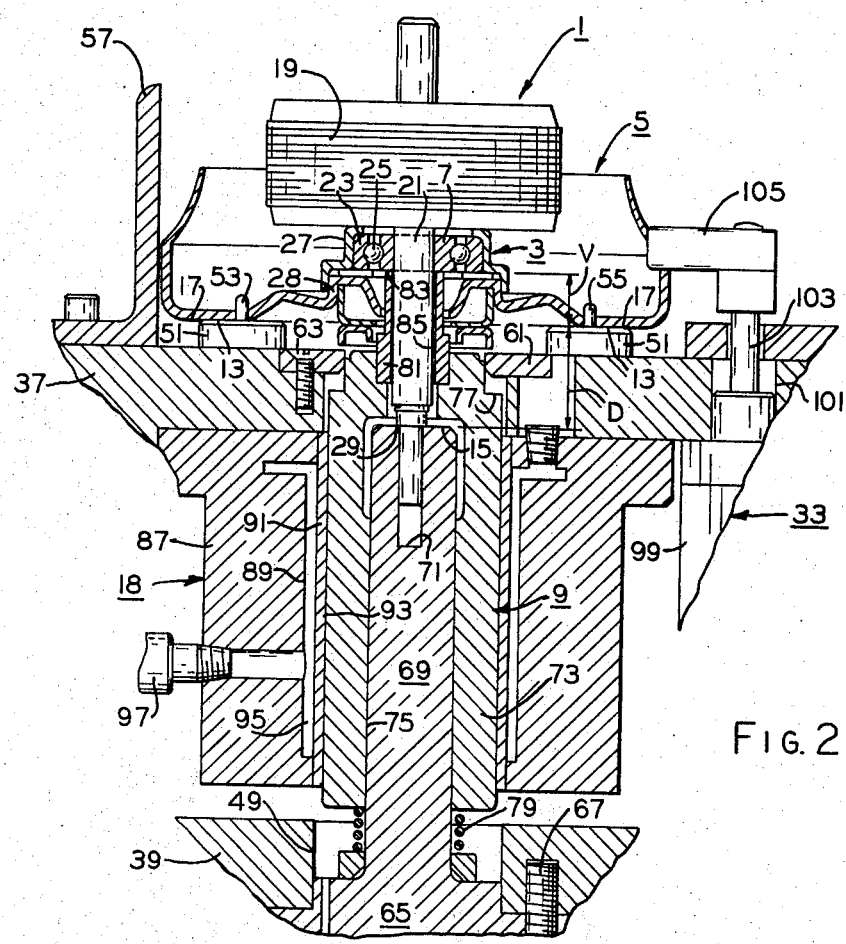
FIG. 2 is a fragmentary sectional view taken from FIG. 1 and showing the rotatable member assembled with the bearing means of the structural component in a located position thereof on the fixturing means.

When bearing means 3 is so seated on thimble seat 83, clamping means 33 are generally simultaneously energized to initially effect conjoint rotation of their stems 103 and clamping fingers 105 toward a position extending over an adjacent associated portion of end frame 5 and thereafter to conjointly move the stems and clamping fingers downwardly. This downward movement engages clamping fingers 105 with end frame 5 and thereafter conjointly moves the end frame downwardly to clamp and locate or reference its flats 17 on locating surfaces 13 of lower fixturing means 11 thereby to predeterminately position the end frame on the lower fixturing means. In this manner, flats 17 of end frame 5 are now located the predetermined dimension D from locating surface 15 on centerpost 65. Of course, since thimble 81 is engaged with inner race 7 of bearing means 3, the thimble and piston 73 of supporting means 9 are conjointly movable with end frame 5 downwardly on centerpost 65 against spring 79 to the displaced positioned determined upon the engagement of end frame flats 17 with their respective locating surfaces 13, as shown in FIG. 2. It may be noted that this conjoint downward movement of supporting means 9 ascertains and compensates for dimensional variance between the actual mounted position of bearing means 3 and the preselected or designed mounted position thereof in end frame 5 with respect to the flats 17 thereof, as previously mentioned, when the flats are engaged with their respective locating surfaces. When supporting means 9 is so moved to its displaced position, hydraulic chuck 18 is actuated by applying fluid pressure from a source thereof (not shown) through fitting 97 into expansible chamber 95 acting on the effective area of sleeve 91 therein to establish a force for urging or flexing the sleeve bore wall 93 into gripping, chucking or displacement preventing engagement with piston 73 thereby to maintain supporting means 9 in its displaced position with thimble seat 83 thereof supportingly engaging inner race 7 of bearing means 3.

At this time, ram 107 is actuated moving upper fixturing means 35 downwardly to move rotatable member 1 relative to bearing means 3 toward assembled relation therewith, and in this manner, shaft 21 is moved through the bore defined in inner race 7 of the bearing means in press fitting relation therewith. Of course, the force developed by ram 107 for establishing the press-fitting engagement between bearing means 3 and shaft 21 is transmitted directly from the inner race 7 of the bearing means to thimble 81 and piston 73 due to the engagement of thimble seat 83 with the inner race. Since sleeve 91 is disposed in gripping engagement with piston 73, the press-fitting force is transferred from the piston to the sleeve and through housing 87 of hydraulic chuck 18 to upper platen 37 of lower fixturing means 11 for absorption thereby. In this manner, it may be noted that the press-fitting force is transmitted from inner race 7 of bearing means 3 only to supporting means 9 for absorption by lower fixturing means 11 wherein the other anti-friction components, such as outer race 23 and ball bearings 25, of the bearing means are generally isolated from the press-fitting force thereby to preserve the anti-friction characteristics or capacity of the bearing means.

Upon further downward movement of shaft 21 through bearing means 3 and guide passage 85 of thimble 81 into blind bore 71 of centerpost 65, locating shoulder 29 of the shaft is moved into engagement or abutment with locating surface 15 on the centerpost thereby to terminate the downward movement of rotatable member 1 into assembled relation with the bearing means. It may be noted the locating engagement of shaft shoulder 29 with centerpost locating surface 15 disposes the shoulder the predetermined distance D from flats 17. In this manner, there is provided a generally constant or uniform extension of shaft 21 from the exterior side of end frame 5, i.e., from locating flats 17 thereof which are located in engagement with locating surface 13, irrespective of the dimensional variance V which might exist between the mounted position of bearing means 3 with respect to the locating flats, as previously mentioned. Of course, during the downward travel of upper fixturing means 35 and ram 107 for assembling rotatable member 1 with bearing means 3, as above described, retaining fingers 109 are engaged with abutments or rollers 125 therefor, and such engagement pivots the retaining fingers against their spring loads toward a position disengaged or released from rotor 19 so as not to interfere or obstruct the movement of the rotatable member into assembled relation with the bearing means.

With the shaft extension so determined, further downward travel of upper fixturing means 35 relative to both rotatable member 1 and lower fixturing means 11 engages abutment end 112 of plunger 113 with the upper end of shaft 21 so as to displace the plunger from abutment 117 of the upper fixturing means and effect compression of plunger spring 115. This relative downward movement of upper fixturing means 35 then moves Vlier pin 119 into short circuiting engagement with plunger 113 which terminates the downward movement of ram 107 and also initiates the return travel or upward movement thereof toward its original or starting position, as previously mentioned. As will be recalled, the engagement of retaining fingers 109 with abutments 125 therefor releases the retaining fingers from rotor 19, and during the return or upward travel or stroke of upper fixturing means 35 with ram 107, the engagement between the retaining fingers and their abutments is maintained until the retaining fingers are raised above rotor 19 when rotatable member 1 is assembled with bearing means 3 in end frame 5. After retaining fingers 109 clear the upper end of rotor 19, the retaining fingers disengage from their abutments 125, and the spring load on the retaining fingers then return them to their original position for accepting the next rotatable member to be assembled with the next end frame ram 107 returns to its original position.

From the foregoing, it is now apparent that methods and apparatus 31 for assembling components for a dynamoelectric machine have been provided meeting the objects and advantages set out hereinbefore and that changes may be made with respect to the precise arrangements, shapes and details of the construction, as well as the precise arrangements of the steps of the methods, set out herein for purposes of illustrating the invention by those skilled in the art without departing from the spirit or scope of the invention as defined by the claims which follow.

What we claim as new and desire to secure by letters Patent in the United States is:

1. A method of assembling a rotatable member with a bearing means mounted to a structural component for a dynamoelectric machine comprising the steps of:
   a. disposing only an inner race of the bearing means generally coaxially of and in engagement with means for supporting it; and
   b. press-fitting the rotatable member through the inner race of the bearing means while transmitting the force of the press-fitting only to the supporting means and isolating all other anti-friction components of the bearing means from the force of the press-fitting.

2. The method as set forth in claim 1, wherein the press-fitting step includes limiting the extension of the rotatable member through the inner race with respect to a reference portion of the structural component.

3. The method as set forth in claim 1, comprising the intermediate step of ascertaining the mounted position of the bearing means in the structural component with respect to a referenced portion thereof.

4. The method as set forth in claim 3, wherein the press-fitting step further comprises engaging the rotatable member with another referenced portion associated with the mounted position of the bearing means in the structural component thereby to limit the extension of the rotatable member through the inner race of the bearing means.

5. The method as set forth in claim 3, comprising the intermediate step of maintaining the supporting means against displacement subsequent to the ascertaining step for receiving the press-fitting force during the press-fitting step.

6. The method as set forth in claim 1, comprising the intermediate step of displacing the structural component and supporting means conjointly toward a position for referencing at least a predetermined portion of the structural component to predeterminately locate the mounted position of the bearing means in the structural component with respect to the predetermined portion.

7. The method as set forth in claim 6, wherein the intermediate step further comprises maintaining the supporting means in the referencing position and in engagement with the bearing means.

8. The method as set forth in claim 7, wherein the press-fitting step comprises engaging another predetermined portion in the rotatable member with another referenced portion associated with the supporting means thereby to limit the extension of the rotatable member through the inner race.

9. A method of assembling a rotatable member with bearing means of a structural component for a dynamoelectric machine comprising the steps of:
a. disposing the structural component upon means for fixturing it with the bearing means being engaged with means for supporting it which is movable in the fixturing means;
b. displacing the structural component and supporting means conjointly generally toward predeterminately spaced apart locating surfaces on the fixturing means and engaging at least a portion of the structural component with one of the locating surfaces;
c. maintaining the supporting means in its displaced position relative to the other of the locating surfaces; and
d. moving the rotatable member relative to the bearing means into assembled relation therewith.

10. The method as set forth in claim 9, wherein the moving step further comprises engaging the rotatable member with the other locating surface for terminating the rotatable member movement.

11. The method as set forth in claim 9, wherein the disposing step includes engaging the supporting means only with an inner race of the bearing means.

12. The method as set forth in claim 11, wherein the moving step further comprises press-fitting the rotatable member through the inner race and transmitting the force thereof only through the inner race to the supporting means so as to isolate the other anti-friction components of the bearing means from the press-fitting force.

13. The method as set forth in claim 9, wherein the displacing step includes compensating for variances from a preselected mounted position of the bearing means in the structural component with respect to a preselected portion thereof.

14. A method of predeterminately positioning a rotatable member with respect to bearing means mounted to a structural component of a dynamoelectric machine comprising the steps of:
a. determining a variance from a preselected mounted position of the bearing means in the structural component with respect to at least a predetermined portion of the structural component; and
b. assembling the rotatable member with the bearing means by locating at least another predetermined portion on the rotatable member relative to the structural component pre-determined portion to compensate for the variance.

15. The method as set forth in claim 14, wherein the determining step comprises disposing at least a portion of the bearing means on means for supporting it and displacing the structural component and the supporting means conjointly toward a position engaging the predetermined portion with means for predeterminately locating it.

16. Method of maintaining between at least preselected limits a dimension between a selected portion of a structural component having bearing means mounted therein and another selected portion of a rotatable member for a dynamoelectric machine adapted for assembled relation with the bearing means comprising the steps of:
a. ascertaining a dimensional variance between the mounted position of the bearing means and a preselected mounted position therefor in the structural component with respect to at least one predetermined plane of reference;
b. maintaining constant the dimensional variance with respect to another predetermined plane of reference; and
c. disposing the rotatable member in assembled relation with the bearing means with the selected portion of the rotatable member located generally with respect to the other reference plane.

17. Apparatus for assembling a rotatable member with bearing means of a structural component for a dynamoelectric machine comprising means for supporting only an inner race of the bearing means, and means for pressing the rotatable member through the inner race wherein the force of the pressing is transmitted only to the supporting means so as to generally isolate all other anti-friction components of the bearing means from the force.

18. The apparatus as set forth in claim 17, further comprising means for locating engagement with the structural component, and the supporting means including means for effecting conjoint displacement thereof with the structural component toward engagement thereof with the locating means.

19. The apparatus as set forth in claim 18, further comprising means for maintaining the supporting means in its displaced position when the structural component is engaged with the locating means.

20. The apparatus as set forth in claim 18, further comprising other means for locating engagement with the rotatable member to predetermine the extension thereof through the inner race relative to the first named locating means.

21. The apparatus as set forth in claim 18, wherein the conjoint movement of the supporting means and structural component to engage it with the locating means ascertains a dimensional variance between the mounted position of the bearing means and a preselected mounted position therefor in the structural component.

22. The apparatus as set forth in claim 21, further comprising other means for locating engagement with the rotatable member and predeterminately spaced from the first named locating means thereby to compensate for the dimensional variance and maintain the extension of the rotatable member between the first named and other locating means substantially constant.

23. The apparatus as set forth in claim 17, wherein the pressing means includes means for limiting the pressing force between a pair of preselected values.

24. Apparatus for assembling a rotatable member with bearing means of a structural component for a dynamoelectric machine comprising means for fixturing the structural component including a pair of means predeterminately spaced apart for locating the rotatable member and structural component, means for moving the structural component toward a located position engaging at least a portion thereof with one of the locating means, means for supporting at least a portion of the bearing means and conjointly movable with the structural component toward the located position, and means for moving the rotatable member relative to the bearing means into assembled relation therewith until the rotatable member engages the other locating means when the structural component and supporting means are in the located position.

25. The apparatus as set forth in claim 24, wherein the bearing means includes among other anti-friction components thereof an inner race, and the rotatable member being movable through the inner race into press-fitting engagement therewith in the assembled relation of the rotatable member and the bearing means.

26. The apparatus as set forth in claim 25, wherein the supporting means is engaged only with the inner race of the bearing means so as to generally isolate the other anti-friction components thereof from the force for press-fitting the rotatable member and the inner race.

27. The apparatus as set forth in claim 24, wherein the supporting means includes means for passage of the rotatable member through the supporting means.

28. The apparatus as set forth in claim 24, further comprising means for opposing the conjoint movement of the supporting means with the structural component.

29. The apparatus as set forth in claim 28, wherein the opposing means is a spring.

30. The apparatus as set forth in claim 24, further comprising means for maintaining the supporting means in the located position when the rotatable member is moved into assembled relation with the bearing means.

31. The apparatus as set forth in claim 30, wherein the maintaining means is a chucking device operable generally for gripping engagement with the supporting means.

32. The apparatus as set forth in claim 24, wherein the pressing means includes means for securing the rotatable member in releasable engagement within the pressing means.

33. The apparatus as set forth in claim 32, further comprising means for actuating the securing means to release the rotatable member at least upon the movement thereof into assembled relation with the bearing means.

34. The apparatus as set forth in claim 24, further comprising means for interrupting the operation of the pressing means when the force thereof for effecting the assembled relation of the rotatable member and bearing means exceeds a predetermined value or is less than another predetermined value predeterminately less than the first named predetermined value.

35. The apparatus as set forth in claim 24, wherein the moving means include a plurality of means for releasable engagement with the structural component, the releasable engagement means being operable generally to engage and move the structural component to its located position and to release the structural component upon the movement of the rotatable member into its assembled relation with the bearing means.

36. Apparatus for assembling a rotatable member with bearing means mounted to a structural component for a dynamo-electric machine comprising a pair of relatively movable means for respectively fixturing the rotatable member and the structural component, the fixturing means being relatively movable for moving the rotatable member and bearing means into assembled relation, and one of the fixturing means including means for compensating for dimensional variance between the mounted position of the bearing means in the structural component and a selected portion thereof to maintain within predetermined limits a dimension between the selected portion and another selected portion on the rotatable member when the rotatable member and bearing means are moved into assembled relation.

37. Apparatus for assembling a rotatable member with bearing means mounted to a structural component for a dynamo-electric machine comprising means for fixturing the structural component, means for determining the mounted position of the bearing means in the structural component relative to a predetermined portion thereof when the structural component is disposed in the fixturing means, means for moving the rotatable member relative to the bearing means into assembled relation therewith, and means for locating another predetermined portion on the rotatable member relative to the structural component predetermined portion to terminate the relative movement of the rotatable member.

* * * * *